(12) United States Patent
Gibbs

(10) Patent No.: US 6,356,935 B1
(45) Date of Patent: Mar. 12, 2002

(54) APPARATUS AND METHOD FOR AN AUTHENTICATED ELECTRONIC USERID

(75) Inventor: Benjamin K. Gibbs, Colorado Springs, CO (US)

(73) Assignee: Xircom Wireless, Inc., Colorado Springs, CO (US)

( * ) Notice: Subject to any disclaimer, the term of this patent is extended or adjusted under 35 U.S.C. 154(b) by 0 days.

(21) Appl. No.: 09/133,875

(22) Filed: Aug. 14, 1998

(51) Int. Cl.[7] .............................................. G06F 15/16
(52) U.S. Cl. ........................ 709/206; 709/225; 709/245; 713/170; 713/176; 713/180
(58) Field of Search ................................ 713/150, 155, 713/156, 158, 159, 162, 170, 172, 176, 180; 709/206, 245, 225

(56) References Cited

U.S. PATENT DOCUMENTS

| | | | | |
|---|---|---|---|---|
| 4,281,215 A | 7/1981 | Atalla | ...................... | 178/22.08 |
| 4,309,569 A | 1/1982 | Merkle | ..................... | 178/22.08 |
| 4,405,829 A | 9/1983 | Rivest et al. | ............... | 178/22.1 |
| 4,713,780 A | 12/1987 | Schultz et al. | .............. | 364/514 |
| 4,881,264 A | 11/1989 | Merkle | ......................... | 380/25 |
| 4,934,846 A | 6/1990 | Gilham | ........................ | 400/104 |
| 4,977,595 A | 12/1990 | Ohta et al. | ..................... | 380/24 |
| 5,093,918 A | 3/1992 | Heyen et al. | ................. | 395/725 |
| 5,142,577 A | 8/1992 | Pastor | ........................ | 380/21 |
| 5,204,961 A | 4/1993 | Barlow | ........................ | 395/725 |
| 5,224,164 A | 6/1993 | Elsner | ........................... | 380/44 |
| 5,231,668 A | 7/1993 | Kravitz | ......................... | 380/28 |
| 5,307,412 A | 4/1994 | Vobach | ........................ | 380/42 |

(List continued on next page.)

FOREIGN PATENT DOCUMENTS

| | | | | |
|---|---|---|---|---|
| WO | WO 97/46962 | 12/1997 | ........... | G06F/17/60 |
| WO | WO 97/49251 | 12/1997 | ........... | H04N/11/00 |
| WO | WO 98/00787 | 1/1998 | ........... | G06F/13/00 |
| WO | WO 98/18249 | 4/1998 | ........... | H04L/29/06 |
| WO | WO 98/37680 | 8/1998 | | |
| WO | WO 98/51064 | 11/1998 | ............ | H04M/3/42 |
| WO | WO 98/51116 | 11/1998 | ........... | H04Q/11/04 |
| WO | WO 99/04344 | 1/1999 | ........... | G06F/13/00 |

OTHER PUBLICATIONS

R. J. Hall, How to Avoid Unwanted Email, Communications of the ACM, Mar. 1998, vol. 41, No. 3, pp. 88–95.

A. Arensburger, et al., To Take Arms Against a Sea of Email, Communication of the ACM, Mar. 1995, vol. 38, No. 3, pp. 108–109.

T. Bass, et al., A Simple Framework for Filtering Queued SMTP Mail (Cyberwar Countermeasures), MILCOM 97 Proceedings, Nov. 5, 1997, vol. 3, pp. 1140–1144.

(List continued on next page.)

Primary Examiner—Dung C. Dinh
(74) Attorney, Agent, or Firm—Lyon & Lyon LLP

(57) ABSTRACT

A method and apparatus for an authenticated electronic userid is provided. According to one embodiment, an adapted digital signature is generated for an outbound message from a local user that authorizes a remote user to reply to the message. The adapted digital signature becomes part of an authenticated electronic userid and, when a reply from the remote user is made, the reply message includes the authenticated electronic userid. A one-way hash function is employed to generate the adapted digital signature. According to one embodiment, if an inbound message to a local user from a remote user does not have an authenticated electronic userid, in particular the adapted digital signature, then the inbound message is rejected. An advantage of the method and apparatus described herein is that unsolicited bulk electronic messages and other non-authorized communications to a local user of an electronic message system are reduced.

31 Claims, 4 Drawing Sheets

U.S. PATENT DOCUMENTS

| | | | |
|---|---|---|---|
| 5,319,710 A | 6/1994 | Atalla et al. | 380/23 |
| 5,349,649 A | 9/1994 | Iijima | 395/275 |
| 5,351,293 A | 9/1994 | Michener et al. | 380/21 |
| 5,367,573 A | 11/1994 | Quimby | 380/25 |
| 5,371,796 A | 12/1994 | Avarne | 380/23 |
| 5,377,354 A | 12/1994 | Scannell et al. | 395/650 |
| 5,432,852 A | 7/1995 | Leighton et al. | 380/30 |
| 5,434,918 A | 7/1995 | Kung et al. | 380/25 |
| 5,440,634 A | 8/1995 | Jones et al. | 380/24 |
| 5,473,691 A | 12/1995 | Menezes et al. | 380/25 |
| 5,479,514 A | 12/1995 | Klonowski | 380/47 |
| 5,493,692 A | 2/1996 | Theimer et al. | 455/26.1 |
| 5,537,475 A | 7/1996 | Micali | 380/30 |
| 5,539,826 A | 7/1996 | Dwork et al. | 380/30 |
| 5,542,046 A | 7/1996 | Carlson et al. | 395/186 |
| 5,592,553 A | 1/1997 | Guski et al. | 380/23 |
| 5,604,803 A | 2/1997 | Aziz | 380/25 |
| 5,606,668 A | 2/1997 | Shwed | 395/200.11 |
| 5,619,648 A | 4/1997 | Canale et al. | 395/200.01 |
| 5,638,446 A | 6/1997 | Rubin | 380/25 |
| 5,732,137 A | 3/1998 | Aziz | 380/25 |
| 5,740,361 A | 4/1998 | Brown | 395/187.01 |
| 5,751,813 A | 5/1998 | Dorenbos | 380/49 |
| 5,751,814 A | 5/1998 | Kafri | 380/49 |
| 5,754,659 A | 5/1998 | Sprunk et al. | 380/30 |
| 5,764,762 A | 6/1998 | Kazmierczak et al. | 380/4 |
| 5,764,772 A | 6/1998 | Kaufman et al. | 380/30 |
| 5,787,178 A | 7/1998 | Schwenk | 380/30 |
| 5,825,883 A | 10/1998 | Archibald et al. | 380/25 |
| 5,826,022 A | 10/1998 | Nielsen | 395/200.36 |
| 5,850,446 A | 12/1998 | Berger et al. | 380/24 |
| 5,852,665 A | 12/1998 | Gressel et al. | 380/30 |
| 5,857,022 A | 1/1999 | Sudia | 380/23 |
| 5,867,578 A | 2/1999 | Brickell et al. | 380/23 |
| 5,892,904 A | 4/1999 | Atkinson et al. | 395/187.01 |
| 5,930,479 A * | 7/1999 | Hall | 709/238 |
| 5,943,426 A | 8/1999 | Frith et al. | 380/25 |
| 5,958,051 A | 9/1999 | Renaud et al. | 713/200 |

OTHER PUBLICATIONS

L. Blum, et al., A Simple Unpredictable Pseudo–Random Number Generator, Siam Journal On Computing, May 1986, vol. 15, No. 2, pp. 364–383.

Nist, The Digital Standard Signature Standard, Communications of the Law, Jul. 1992, vol. 35, No. 7, pp. 36–40.

C. Dwork, et al., Pricing Via Processing or Combatting Junk Mail, Proc. of Crypto, Aug. 1992, pp. 39–145.

P.G. Neumann, Risks in Digital Commerce, Communications of the ACM, Jan. 1996, vol. 39, No. 1, p. 154.

N. Asokan, et al., The State of the Art in Electronic Payment Systems, Computer, The Future of Micro Processors, Sep. 1997, pp. 28–35.

M. Wagner, Cyber Junk, Computerworld, Aug. 26, 1996, vol. 30, No. 35, p. 28.

B. Cole–Gomolski, Message Managers Aim to Control Junk E–mail, Computerworld, May 5, 1997, vol. 31, No. 18.

G. Faulkner, A New and Nasty Way to Flood Networks with Spam, Lantimes, <http://www.lantimes.com/97/97sep/709c040a.html>, Sep. 1997.

P. Collinson, Putting a Stop to Spam, Centaur Communications EXE, Nov. 3, 1997.

Table of Contents, Choking on Spam, Nov. 1997, vol. 17, No. 13, p. 105.

Communications Software, Help Block Spam, Dec. 1997, vol. 10, No. 12, p. 286.

PC/Computing, Spam Killers, Dec. 1997, vol. 10, No. 12, p. 433.

D. Blankenhorn, Datamation, You Can Win The War Against Spam!, <http://www.datamation.com/PlugIn/issues/1998/august/08web.html>, Aug. 1998.

Y. Matias, et al., Lightweight Security Primitives for E–Commerce, in or after Jun. 1997, p. 1–8.

E. Gabber, et al., Curbing Junk E–Mail via Secure Classification, in or after May 1998, p. 1–12.

D. Bleichenbacher, et al. On Secure and Pseudonymous Client–Relationships with Multiple Servers, May 1998, p. 1–14.

E. Gabber, et al., How to Make Personalized Web Browsing Simple, Secure, and Anonymous, Feb. 1997, p. 1–16.

L.C. Cranor, et al., Spam!, Communications of the ACM, vol. 41, No. 8, Aug. 1998, p. 74–83.

R.J. Hall, Channels: Avoiding Unwanted Electronic Mail, American Mathematical Society, 1997, p. 1–17.

The Lucent Personalized Web Assistant, A Bell Labs Technology Demonstration, <http://www.bell–labs.com/projects/Ipwa/>, on or after Jun. 1997, p. 1–2.

News & Info, News Release, Lucent Technologies Introduces Technology That Protects Net Surfer' Privacy, <http://www.lucent.com/press/0697/9706.bla.html>, Jun. 10, 1997, p. 1–2.

M. Stutz, Wirednews, Covering Your Tracks via a Helping Hand, <http://www.wired.com/news/technology/story/4375.html>, Jun. 10, 1997, p. 1–3.

Lucent Introduces Personal Protection Technology, News Watch, <http://www.zdnet.com/icom/news/199706/12/news2.html>, Jun. 12, 1997, p. 1–2.

a2i(rahul.net) anti–junk–email–features, <http://www.rahul.net/guest/nojunk.html>, 1998, p. 1–2.

a2i–nojunk—anti–junk–email system, <http://www.rahul.net/gu7est/a2i–nojunk.1.txt>, date unknown, p. 1–16.

W. Diffie, The First Ten Years of Public–Key Cryptography, Proceedings of the IEEE, vol. 76, No. 5, May 1998, p. 560–577.

* cited by examiner

APPARATUS AND METHOD FOR AN AUTHENTICATED ELECTRONIC USERID

FIELD OF THE INVENTION

The present invention relates electronic user identification, and more specifically, to an apparatus and method for an authenticated electronic userid.

BACKGROUND OF THE INVENTION

Electronic mail, or "e-mail" has become one of the most popular forms of point-to-point communication for people with access to the Internet. An e-mail system typically comprises a database server, a local area network (LAN) and/or a modem bank, and an internet gateway. A user, who communicates with others via e-mail is typically given a user identification, or "userid" that permanently and uniquely identifies that user with the database server. The server typically has its own identity too, for example, the server is sometimes referred to as a host and the identity is called a "host name", or in some circles, a "domain name." When a user desires to check their e-mail, the user logs onto the e-mail system and e-mail messages are displayed on a terminal device or personal computer. A great advantage of e-mail over traditional mail, which accounts, in part, for its surge in popularity, is that messages can be delivered significantly faster, messages can be easily distributed to significantly more recipients, and it is, generally, less expensive for the user than regular mail, or "snail mail."

However, the very properties which make e-mail so appealing over snail mail to a regular user can also create annoyances. The low cost, the ability for wide distribution and speed of e-mail make it particularly attractive to unsolicited bulk e-mail advertisers. Unsolicited bulk e-mail ("UBE") has fast become the advertising medium of choice for startup and sham companies looking to quickly and cheaply advertise their wares to a large audience. Frequently, such companies employ an application called a robot that searches electronic databases on the Internet (e.g., Yahoo, Lycos, AltaVista, etc.) for certain keywords that identify the demographics of a target market. From the database "hits", a list of uniform resource locators ("URLs") for both websites and bulletin boards is compiled. The robot then methodically loads and scans the hypertext markup language source ("html") or ASCII text pages identified by the URLs and harvests e-mail addresses. The e-mail addresses are then added into a distribution list to which e-mail advertisements, or UBE messages, are spooled out.

The ease with which e-mail addresses can be harvested not only from the various Internet search engines, but also from the "to:", "from:" and "cc:" fields in an e-mail messages (e.g., a joke circulating the internet could have been forwarded to hundreds of unique e-mail addresses) and newsgroups has caused a proliferation of UBE. Eventually, these messages litter the e-mail of a user's "inbox" and the user must sift and sort the junk messages from the important messages.

Another problem associated with the traditional e-mail address paradigm is that a user may only wish to communicate once, or on a per-reply basis with another user. Whereas in trusted communications, such as inter-organization and personal communications, a single address is desired, in other scenarios, a restricted use e-mail address is desired. For example, an individual may only desire a single or temporary communication with a particular user, rather than giving the particular user a permanent e-mail address.

Known examples of filtering UBE messages and other non-trusted communications include querying incoming messages for certain unwanted sender addresses (e.g., the sender's e-mail address) and/or contextual keywords or phrases in the message body. For example, see U.S. Pat. No. 5,619,648, invented by Canale et al., which discloses such a system. Similarly, e-mail messages from known UBE sender domain names can be explicitly blocked.

However, a problem with query and filter techniques is that the e-mail addresses must often be explicitly defined each time a new bulk mailer sends UBE. Further still, a domain name (as well as the e-mail address) is easily manipulated or "spoofed" by the originating bulk mailer. For example, the America On-Line "AOL" service domain name is often mimicked because many e-mail users will not block mail from the "aol.com" host because they know many people who subscribe to the AOL service. Furthermore, contextual query and filter techniques are prone to error and are difficult, if not impossible to setup correctly. Certainly, legitimate and potentially important messages will slip through the cracks with such systems.

Thus, there is a need for a unique method and apparatus for authenticating electronic messages that is capable of controlling UBE and other forms of electronic messages that clutter communication applications such as electronic mail.

SUMMARY OF THE INVENTION

An apparatus and method for an authenticated electronic userid is provided. According to one embodiment, an electronic message system generates an authenticated electronic userid for a local user that comprises an adapted digital signature. The adapted digital signature, with other identifiers, provides temporary or restricted electronic message privileges to a remote user.

According to one embodiment, the adapted digital signature grants privileges to a particular remote user for access to a single local user on the message system. However, according to another embodiment, the adapted digital signature grants privileges to a number of remote users from a particular host for access to one or more local users on the message system.

In one embodiment, a process for creating an authenticated electronic userid comprises the acts of generating an adapted digital signature based on an originator key and a portion of a remote userid, and concatenating the adapted digital signature with originator information to form the authenticated electronic userid.

In another embodiment, a process for authenticating an adapted digital signature comprises the acts of extracting a local userid and remote user information from an incoming electronic message; comparing the local userid to a list of local users; verifying the adapted digital signature is valid; and then granting access to an electronic service if the adapted digital signature is valid.

As a result of the techniques described herein, UBE and other forms of unsolicited or undesired electronic messages are filtered in a more controlled manner than prior methods, and a local user will not need to remove UBE messages from their messaging application.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Figure 1:
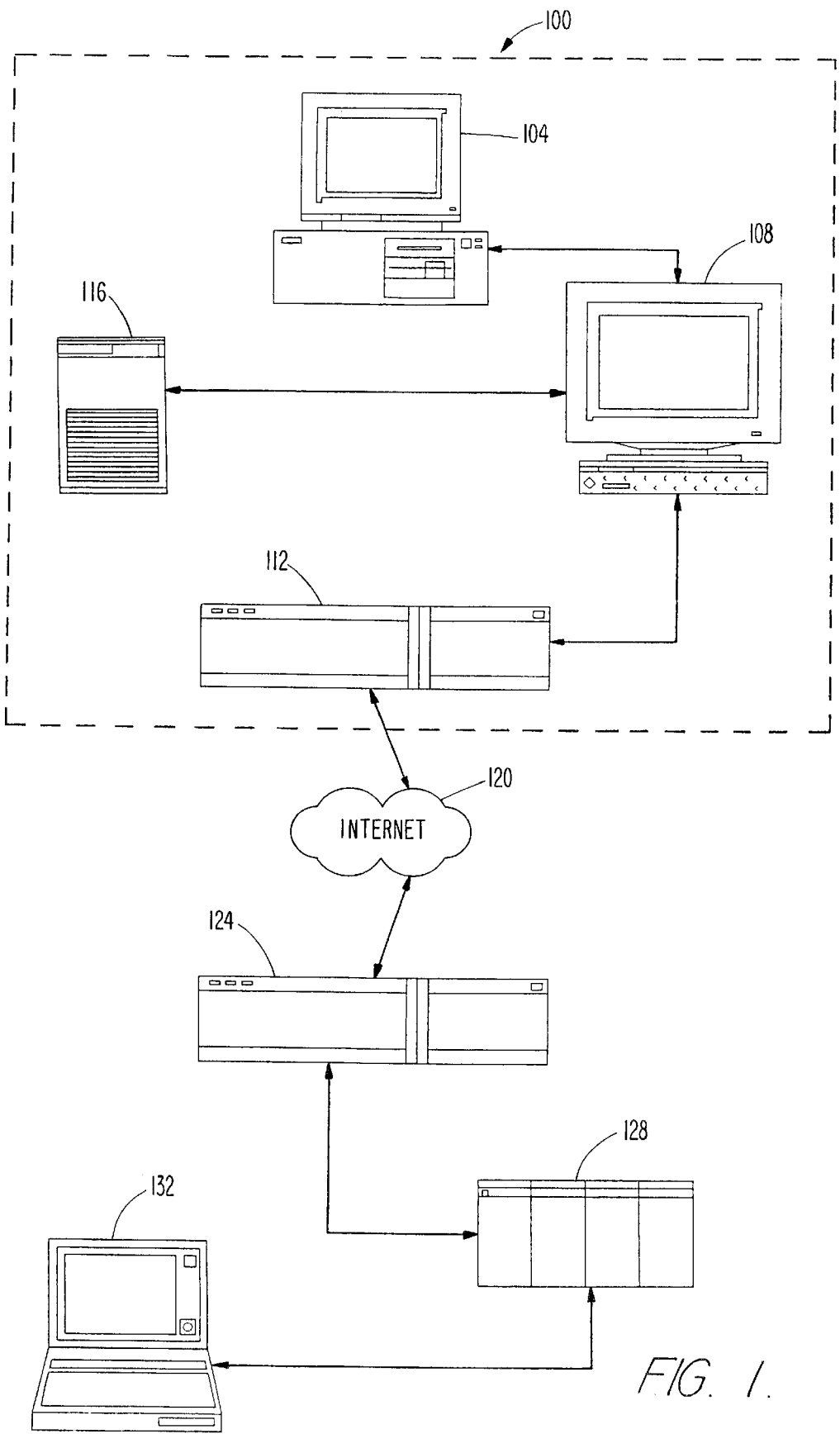
FIG. 1 is a diagram illustrating one embodiment of an electronic messaging system employing an authenticated message server.

FIG. 1 depicts an electronic messaging system 100 according to one embodiment of the present invention. System 100 includes a server 108, coupled to a terminal unit or personal computer 104, a router 112, and an authenticated message server 116. The interconnection or coupling mechanism between the various devices is preferably a fiber optic network cable, but it can also be a twisted pair, or a wireless interconnection. According to one embodiment, server 108 is a Sun Microsystems SPARC™ system running electronic message software such as Oracle Corporation's InterOffice™ messaging server. Router 112 is a commercially available internet router such as a Cisco Systems 7500 Series router.

Authenticated message server 116 can run on a standard personal computer, such as an Intel Pentium™ based microprocessor system. However, authenticated message server 116 is alternatively part of the software component stack added to server 108. In such an embodiment, an application programming interface ("API") for the messaging server 108 is added which provides access to the authenticated message server services, specifically, the methods and techniques for generating and verifying authenticated electronic userids as described herein. In the broader spirit of the invention, the system can be highly distributed, wherein incoming and outgoing messages are handled by separate servers or computer systems on an interconnected network (e.g. a LAN).

From the server 108, outgoing electronic messages to remote users are typically passed through an internet gateway router, such as router 112. Router 112 is preferably connected to the internet 120 via a T1 pipeline, or other leased line. Conversely, messages from the internet 120 to a particular local user associated with the server 108 will be passed through router 112.

A remote user typically resides on a personal computer, such as laptop 132, which is also connected to a server 128. Server 128 is configured similar to server 108, but it can also be a different type of server, such as a Digital Equipment Corporation VAX/VMS™ system. The server 128 is likely to run a different messaging system, such as the University of Washington PINE™ messaging system. Similar to router 112, router 124 is connected to server 128 and the internet 120.

In one embodiment, electronic message system 100 further comprises a wireless short message service ("SMS") system. An e-mail to SMS gateway receives an e-mail message (preferably an authenticated message) from router 112 or authenticated message server 116. The gateway converts the e-mail into one or multiple short messages, typically of 160 characters in length, and forwards the short messages to an SMS center. In turn, the SMS center forwards the message over a wireless link (e.g., a wireless local loop) to a local user (e.g., here, the receiving device can be a pager or a cellular telephone). A wireless short message service system is available from Omnipoint Corporation.

Figure 2:
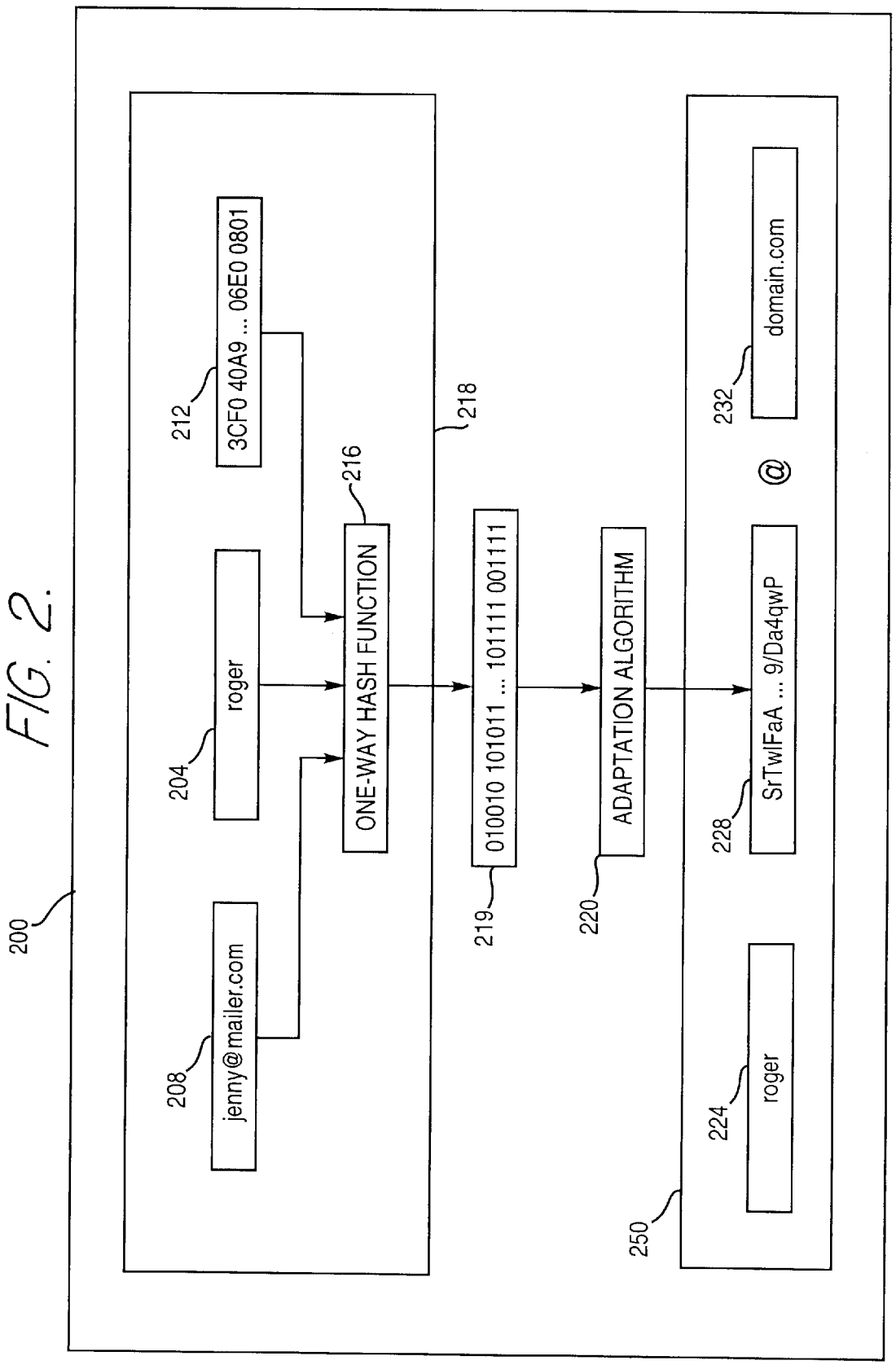
FIG. 2 is a functional diagram illustrating one embodiment of an authenticated message server and an authenticated electronic userid.

FIG. 2 depicts a functional overview of an authenticated message server 200. According to one embodiment, the authenticated message server 200 comprises a digital signature engine 218 and an adaptation algorithm 220.

According to a presently preferred embodiment, a local user "roger", who is using an electronic message system, such as one running on server 108 (identified by the host or domain name "domain.com"), composes and requests to send a message to a remote user identified as "jenny@mailer.com". When local user "roger" requests to send the message to remote user "jenny@mailer.com", part of the message, in particular the remote userid 208 and the originator userid 204, is passed to a digital signature engine 218 for processing. Digital signature engine 218 can also store the local user's (e.g. "roger") private key, depicted in FIG. 2 as originator key 212. Alternatively, the local user's originator key 212 can be sent in addition to or separate from the request by the messaging system residing on server 108. Preferably, originator key 212 is a 256 bit value.

Remote userid 208, originator userid 204 and originator key 212 are passed to one-way hash function 216 in digital signature engine 218. In the present case, remote userid 208 is the value "jenny@mailer.com", originator userid 204 is the value "roger" and originator key 212 is the (partial) originator key for local user "roger", which has a value of "3CF0 40A9 . . . 06E0 $0801_{16}$". One-way hash function 216 performs a computational algorithm on inputs 204, 208 and 212 to generate a fix-length array of bits called a hash value, but referred to herein as a "digital signature" 219.

Preferably, the one-way hash function 216 is the Message Digest 5 ("MD5") function. The MD5 function is described in RFC 1321, entitled "The MD5 Message-Digest Algorithm", by R. Rivest and written in 1992, which is incorporated herein by reference. However, in other embodiments, the computation algorithm is an encryption algorithm that produces a variable length digital signature.

An example of an encryption algorithm that will work in the present invention is the data encryption algorithm defined in ANSI document X3.92-1981 (R1987) entitled "Data Encryption Algorithm", which is incorporated herein by reference. Using a data encryption algorithm, the same inputs as were used to produce the hash value are instead encrypted with an authenticated message server public key or a local user's public key. Note that when such an authenticated electronic userid is returned, it can either be decoded with an authenticated message server private key or a local user's private key, or it can be recomputed using the authenticated message server public key or local user's public key.

Once the digital signature 219 is computed, the digital signature 219 is passed on to adaptation algorithm 220. Adaptation algorithm 220 transforms, or maps the digital signature 219 to an acceptable form for transmission in a return e-mail address. Preferably, a base64 conversion is performed by adaptation algorithm 220, whereby the conterminous 6 bit strings of the digital signature are mapped to ASCII characters as follows:

| 000000–011001 | A–Z |
| 011010–110011 | a–z |
| 110100–111101 | 0–9 |

-continued

| | |
|---|---|
| 111110 | + |
| 111111 | / |

In one embodiment, the output of the adaptation algorithm 220 is an adapted digital signature 228. However, in another embodiment the functionality of the adaptation algorithm 220 is performed by logic circuitry, or it is embedded into the particular computational function (e.g., one-way hash function 216) directly. In still another embodiment, the digital signature 219 does not need to be transformed with a base64 conversion; rather, the messaging system 100 supports binary and other digital formats. However, transforming the digital signature 219 into an adapted digital signature 228 in the form of ASCII characters is preferred, since most legacy systems (e.g., internet e-mail) will generally support the character set. Additionally, the character set is easily replicated on a variety of input devices (e.g., computer keyboards, telephones, etc.) on which the authenticated electronic userid 250 can be typed.

The adapted digital signature 228 will become part of an authenticated electronic userid 250 for the outbound message to the remote user "jenny@mailer.com". Identifiers 224, 228 and 232, together with the other symbols (e.g., a period, an underscore, a hyphen, an ampersand, etc.) are concatenated to form authenticated electronic userid 250. For example, the return address of local user "roger" would appear similar to the address "roger.SrTwIFa9/Da4qwP@domain.com". The authenticated electronic userid 250 will be the return/reply address to local user "roger".

Assuming authorization is otherwise not granted to remote user "jenny@mailer.com", then the only way remote user "jenny@mailer.com" can send an electronic message to local user "roger" is with a message addressed to the authenticated electronic userid 250. Since local user "roger" controls whether remote user "jenny@mailer.com" will receive an authenticated electronic userid 250 with which to send him an electronic message, unsolicited electronic messages and/or unsolicited bulk e-mail from remote user "jenny@mailer.com" should not occur.

Figure 3:
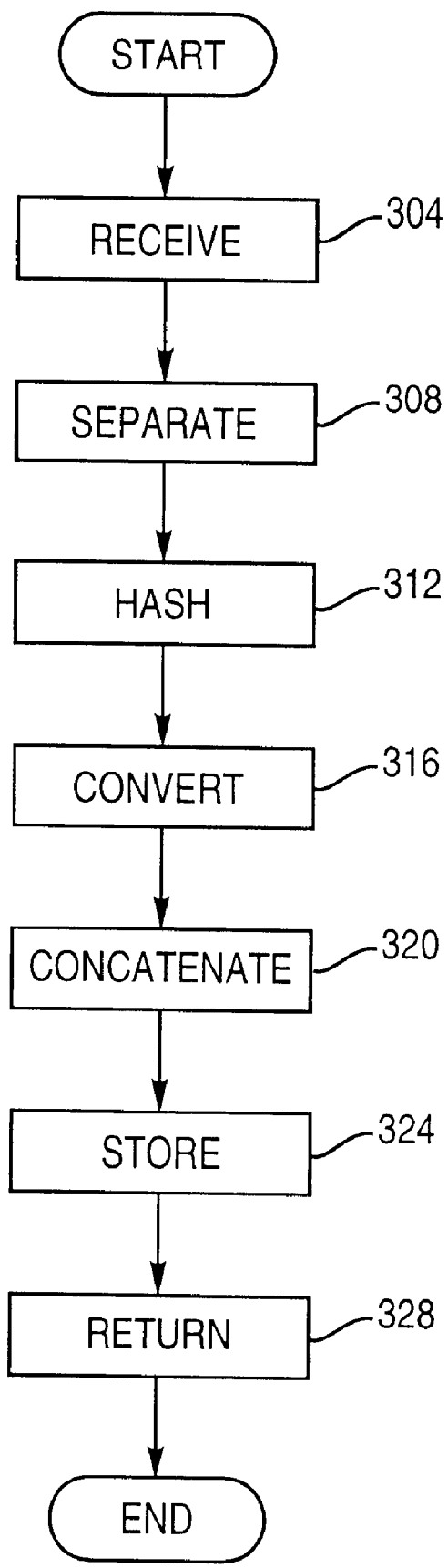
FIG. 3 is a flowchart depicting the steps of generating an authenticated electronic userid.

Turning now to FIG. 3, it depicts a flowchart of the process of generating an authenticated electronic userid 250. In step 304, a request for an authenticated electronic userid 250 is received by the authenticated message server 116. According to one embodiment, an outbound message, which comprises the request, is separated in step 308 and data from the "to:", "from:" fields is extracted. Additionally, the originator key 212 is also separated, if it is included with the message, or it can be stored and retrieved from a table which is part of the authenticated message server 116.

According to one embodiment, the outbound message also comprises pre-processing security level field that identifies the level of security the message is to receive. For example, a "0" security level indicates no authenticated electronic userid is required for the message, where as a "1" indicates that the authenticated electronic userid is good for any person at the host or domain name of the remote user or message recipient. A "2" indicates that the authenticated electronic userid is good only for the remote user or message recipient, and a "3" indicates that the electronic userid is good only for a preset period of time (e.g., 24 hours) for a particular remote user. In one embodiment of an authenticated electronic userid, the value in the security level field is retained as a portion of the adapted digital signature 228. various levels and techniques for identifying the security level of the authenticated electronic userid can be used. Furthermore, if a transferable one-time electronic userid is desired, then the methods and techniques described in issued U.S. Pat. No. 6,085,321, filed on the same day herewith and incorporated herein by reference in its entirety, can be consulted.

Data extracted in the separating step 308, together with the originator key 212 are hashed by the one-way hash function 216 in step 312, preferably using an MD5 hash function, to generate the digital signature 219. After step 312, the digital signature 219 is converted at step 316 using a base64 conversion algorithm. The output of the base64 conversion algorithm is the adapted digital signature 228. The adapted digital signature 228 will, in part, grant the remote user "jenny@mailer.com" privilege to reply or send a message to local user "roger".

In step 320, the output of the adaptation algorithm 220, that is, adapted digital signature 228, the originator identifier 224 and the originator's host or domain name 232 are concatenated as a single authenticated electronic userid (e.g. userid 250). According to one embodiment, the result is stored in an authentication log file that can be indexed and/or searched for matching strings and/or authorization levels in the future. The advantage of such a system is that the authenticated message server 116 can track and record incoming and outgoing messages and privileges so that security breaches can be tracked and examined by an administrator.

In step 328, the authenticated electronic userid 250 is returned to the message server (e.g. server 108). According to one embodiment the process is repeated for the remote user specified in the "cc:" field. When the message server (e.g. 108) spools out messages to the other remote users, the "from:" field will now contain a unique authenticated electronic userid for each of the other users as well. However, in another embodiment the identity of other remote users identified in the "to:" and "cc:" fields are recorded in an authentication log file so they can be matched with the appropriate inputs used when the authenticated electronic userid 250 was created.

In another embodiment, the authenticated message server 116 supports explicit requests for an authenticated electronic userid 250 without the need for sending a message through the message server (e.g. server 108). Such a system can be employed where a local user specifically requests an authenticated electronic userid 250 or desires to give such a userid to a remote user, organization or internet application (e.g., a distribution list.) Instead of spooling out a message with the authenticated electronic userid 250, the authenticated message server 116 will return the authenticated electronic userid 250 directly to the local user.

Figure 4:
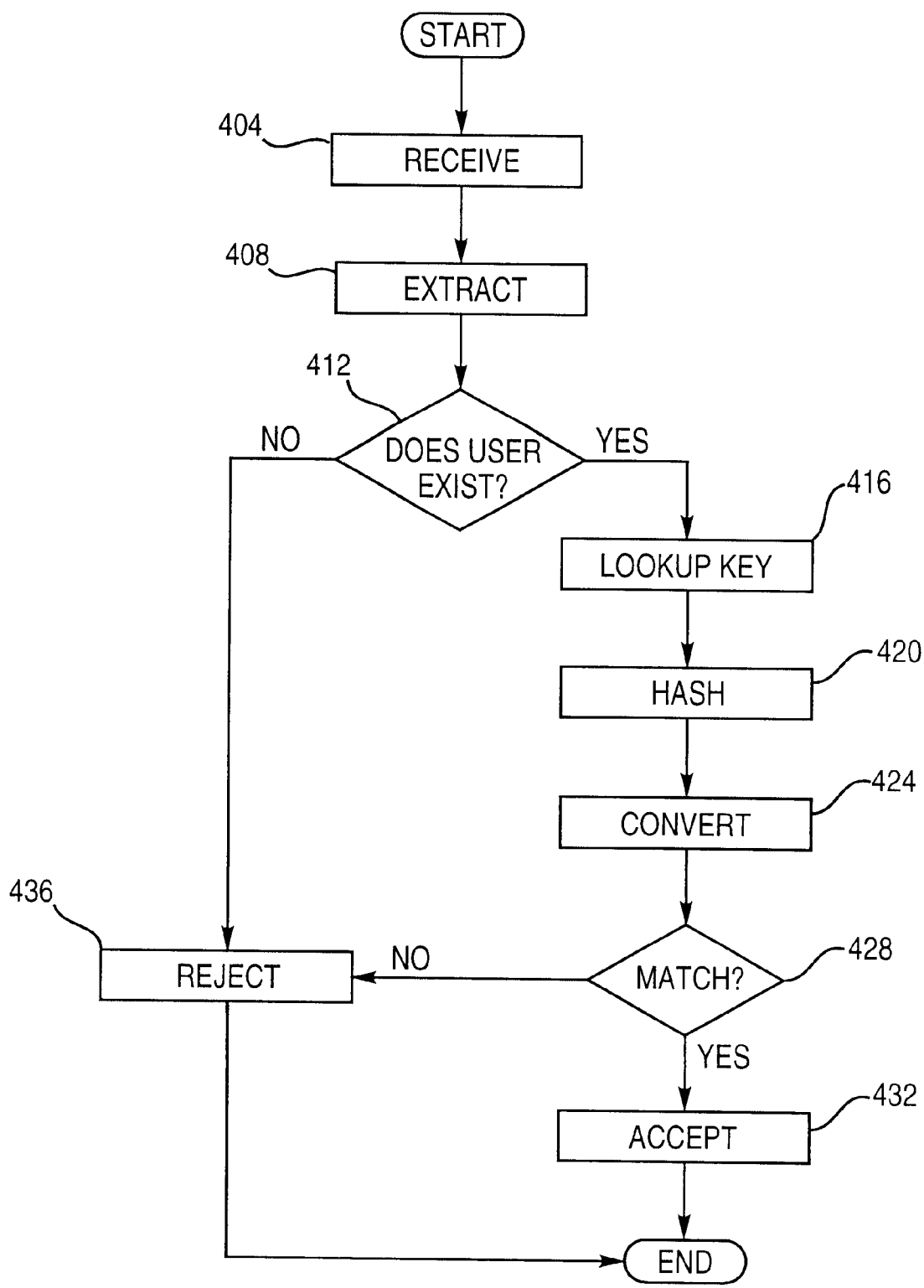
FIG. 4 is a flowchart depicting the steps of verifying an authenticated electronic userid.

FIG. 4 is a flowchart depicting the steps for verifying an authenticated electronic userid 250 based on a message from a remote user. In step 404, an inbound message is passed from router 112 (FIG. 1) to server 108 and is then received by authenticated message server 116. In step 408, header information, also known as envelope information, is separated from the inbound message, and in particular the remote user's domain name, the remote userid and the authenticated electronic userid 250 are extracted. Referring to FIG. 2, the left side of inbound authenticated electronic userid 250, specifically originator identifier 224 (e.g., "roger"), is tested in step 412 to confirm that the user is a valid local user on the messaging system 108. If the originator identifier 224 does not identify a valid local user, then the authenticated message server 116 processing continues to step 436, which is explained in further detail below. If the identifier 224 contains a valid local user, then the process continues to step 416.

In step 416, the authenticated message server 116 performs a lookup on the originator key (e.g., key 212) related to the local user "roger". Next, in step 420, a hash (or alternatively a data encryption algorithm) is performed on the local user's originator key 212, in combination with the remote user name (e.g., "jenny@mailer.com") 208 by the digital signature engine 218. In step 424, the digital signature 219 returned by the digital signature engine 218, at step 420, is converted to ASCII characters by adaptation algorithm 220. The result of the conversion (the adapted digital signature 228) is compared with the adapted digital signature 228 (that is, the portion of the authenticated electronic userid 250 between the "." (period) and the "@" (at symbol)) in step 428. If a match is confirmed, then the authenticated message server 116 continues to step 432, where the inbound message is accepted and passed on to the message server 108. From here, the process terminates, since the local user "roger" can retrieve the message from the message server 108.

However, if a match is not made in step 428, or if the local user does not exist (step 412), then the message is rejected at step 436. According to one embodiment, the remote sender is notified of the rejection and the process ends. However, if tracking is desired, then information about the inbound message (i.e., remote userid, remote host, date, time, etc.) is recorded in a failure log file for examination by a system administrator at a later time.

According to one embodiment, the steps for generating and verifying an authenticated electronic userid 250 are performed by a computer program functioning as a stand-alone server 116, or in an add-on software component in message server 108. In one embodiment, the instructions for performing the methods and techniques described herein (the computer program) are stored on a computer readable medium, such as an electromagnetic storage device (e.g., a floppy disk, a magnetic tape, a hard-disk drive, or other persistent memory device), or an optical data storage medium (e.g., a CD-ROM). Generally, prior to execution of the sequences of instructions, the sequences of instructions are copied from a non-volatile computer readable medium (e.g., the hard-disk drive) to a volatile source (e.g., random access memory) and are executed from the volatile computer readable medium. For purposes of explanation the methods and techniques described herein are performed by an authenticated message server. Where the actual functionality is performed, that is on which piece of hardware, is not important for purposes of this description. For example, server 108 can be configured to perform the functionality of both a message server and an authenticated message server.

In the foregoing specification, the invention has been described with reference to specific embodiments thereof. It will be evident, however, that various modifications and changes can be made thereto without departing from the broader spirit and scope of the invention. For example, larger or smaller originator keys (e.g., 48 or 128 bit originator keys) can be used. Further, the adapted digital signature can be truncated in order to not exceed the boundaries of the address field in an electronic message. Further still the authenticated message server functionality can be incorporated into the message server (e.g. server 108) rather than in a stand-alone device. In still another embodiment, part of the authenticated message server functionality (e.g., generating an authenticated electronic userid) can be performed in a client application running on the local user's computer, rather than passing the function on to the message server or authenticated message server. In one embodiment, the authenticated electronic userid is created by a smartcard coupled to the local user's computer, or a smartcard connected to a user's wireless telephone. The specification and drawings are, accordingly, to be regarded in an illustrative, rather than a restrictive sense.

What is claimed is:

1. A method for verifying an authenticated electronic userid comprising:

receiving an electronic message from a remote user;

extracting an originator identifier, a first adapted digital signature, and at least a portion of a remote userid from said electronic message;

retrieving an originator key based on said originator identifier, said originator key not being shared with said remote user;

generating a second adapted digital signature after receiving said electronic message, said second adapted digital signature based on at least said portion of said remote userid and said originator key;

comparing said first adapted digital signature to said second adapted digital signature;

accepting said electronic message from said remote user if said first adapted digital signature and said second adapted digital signature match; and rejecting said electronic message from said remote user if said first adapted digital signature and said second adapted digital signature do not match.

2. The method of claim 1, wherein said act of generating said second adapted digital signature comprises:

hashing said originator key and said portion of said remote userid with one or more other identifiers to form a digital signature; and converting said digital signature from a first digital format into a second digital format, said digital signature in said second digital format being said second adapted digital signature.

3. The method of claim 1, wherein said act of generating said second adapted digital signature comprises:

performing an encryption function using said originator key and said portion of said remote userid with one or more other identifiers to form a digital signature; and converting said digital signature from a first digital format into a second digital format, said digital signature in said second digital format being said second adapted digital signature.

4. The method of claim 2, further comprising:

comparing said originator identifier to a list of local users; and rejecting said electronic message is if said originator identifier is not found in said list of local users.

5. A method for creating an authenticated electronic userid comprising:

receiving a request for said authenticated electronic userid;

retrieving an originator key, said originator key corresponding to a local userid;

hashing said originator key, said local userid, and at least a portion of a remote userid to form a digital signature;

converting said digital signature from a first digital format into a second digital format, said digital signature in said second digital format being an adapted digital signature;

concatenating said adapted digital signature with at least an originator identifier; and returning a result of said act of concatenating as said authenticated electronic userid.

6. An electronic message system comprising:

a computer configured to run an electronic message server application;

a router coupled to said computer, said router configured to forward a first electronic message from a local user, said first electronic message comprising a first authenticated electronic userid, and said router further configured to receive a second electronic message from a remote user, said second electronic message comprising a second authenticated electronic userid; and a computer program stored in a memory device coupled to said computer, said computer program configured to cause said computer to generate said first authenticated electronic userid for said first electronic message, said first electronic userid having an adapted digital signature and an originator identifier, and said computer program further configured to cause said computer to reject said second electronic message if said computer cannot re-generate said adapted digital signature from an originator identifier, a non-shared originator key, and at least a portion of a remote userid, which is contained in envelope information associated with said second electronic message and match said re-generated adapted digital signature with a portion of said second authenticated electronic userid.

7. The electronic message system of claim 6, wherein said computer program is further configured to generate said adapted digital signature by:

hashing said originator key, at least a portion of said remote userid, and an originator identifier to form a digital signature; and converting said digital signature from a first digital format into a second digital format, said digital signature in said second digital format being said adapted digital signature.

8. The electronic message system of claim 7, wherein said computer program is further configured to:

extract said originator identifier from said envelope information associated with said second electronic message;

compare said originator identifier to a list of local users; and reject said second electronic message if said originator identifier does not match a local userid in said list of local users.

9. An authenticated message server configured to create and verify an authenticated electronic userid, wherein creating said authenticated electronic userid comprises:

receiving a request for said authenticated electronic userid;

retrieving an originator key, said originator key corresponding to a local userid;

generating a first adapted digital signature, said first adapted digital signature based on said originator key and at least a portion of a remote userid;

concatenating said first adapted digital signature with at least an originator identifier; and returning a result of said step of concatenating as said authenticated electronic userid; and wherein verifying said authenticated electronic userid comprises:

receiving an electronic message from a remote user, said electronic message comprising said authenticated electronic userid;

extracting said originator identifier, said first adapted digital signature, and at least said portion of said remote userid from said authenticated electronic userid;

retrieving said originator key based on said originator identifier;

generating a second adapted digital signature, said second adapted digital signature based on at least originator key and at least said portion of said remote userid;

comparing said first adapted digital signature to said second adapted digital signature;

accepting said electronic message from said remote user if said first adapted digital signature and said second adapted digital signature match; and rejecting said electronic message from said remote user if said first adapted digital signature and said second adapted digital signature do not match.

10. The authenticated message server of claim 9, wherein said acts of generating said first adapted digital signature and said second adapted digital signature comprise:

hashing said originator key, said portion of said remote userid, and one or more other identifiers to form a digital signature; and converting said digital signature from a first digital format into a second digital format, said digital signature in said second digital format being said adapted digital signature.

11. The authenticated message server of claim 9, wherein said acts of generating said first adapted digital signature and said second adapted digital signature comprise:

performing an encryption function using said originator key, said portion of said remote userid, and one or more other identifiers to form a digital signature; and converting said digital signature from a first digital format into a second digital format, said digital signature in said second digital format being said adapted digital signature.

12. The authenticated message server of claim 10, wherein said one or more other identifiers include local user information.

13. The authenticated message server of claim 11, wherein said one or more other identifiers include local user information.

14. The authenticated message server of claim 9, wherein said act of verifying said authenticated electronic userid further comprises:

extracting said originator identifier from said envelope information associated with said electronic message;

comparing said originator identifier to a list of local users; and rejecting said electronic message if said originator identifier does not match a particular local userid in said list of local users.

15. A method for filtering junk electronic mail, comprising:

receiving an electronic message from a remote user;

generating an adapted digital signature based on an originator identifier and remote user information from said electronic message and an originator key, said act of generating comprising:

hashing a local userid associated with said originator identifier, said remote user information, and said originator key to form a digital signature;

transforming said digital signature from a first digital format to a second digital format; and returning said digital signature in said second digital format as said adapted digital signature;

comparing said adapted digital signature to a portion of said electronic message;

accepting said electronic message if said adapted digital signature and said portion of said electronic message match; and rejecting said electronic message if said adapted digital signature and said portion of said electronic message do not match.

16. The method of claim 15, wherein said electronic message is a reply to a first electronic message sent from a local userid, said first electronic message comprising said originator identifier, and wherein said portion of said electronic message compared to said adapted digital signature being generated by acts associated with said local userid.

17. The method of claim 16, wherein said acts associated with said local userid 3comprise:

hashing said local userid, said remote user information, and said originator key to form a first digital signature;

transforming said first digital signature from said first digital format to said second digital format; and returning said first digital signature in said second digital format as said portion of said electronic message.

18. A computer-readable medium having stored therein one or more sequences of instructions for causing at least one processor to perform a method for verifying an authenticated electronic userid, the method comprising:

receiving an eletronic message from a remote user;

extracting an originator identifier, a first adapted digital signature, and at least a portion of a remote userid from said electronic message;

retrieving an originator key based on said originator identifier, said originator key not being shared with said remote user;

generating a second adapted digital signature after receiving said electronic message, said second adapted digital signature based on at least said portion of said remote userid and said originator key;

comparing said first adapted digital signature to said second adapted digital signature;

accepting said electronic message from said remote user if said first adapted digital signature and said second adapted digital signature match; and rejecting said eletronic message from said remote user if said first adapted digital signature and said second adapted digital signature do not match.

19. The computer-readable medium of claim 18, wherein said act of generating said second adapted digital signature comprises:

hashing said originator key and said portion of said remote userid with one or more other identifiers to form a digital signature; and converting said digital signature from a first digital format into a second digital format, said digital signature in said second digital format being said second adapted digital signature.

20. The computer-readable medium of claim 18, wherein said act of generating said second adapted digital signature comprises:

performing an encryption function using said originator key and said portion of said remote userid with one or more other identifiers to form a digital signature; and converting said digital signature from a first digital format into a second digital format, said digital signature in said second digital format being said second adapted digital signature.

21. The computer-readable medium of claim 19, further comprising:

comparing said originator identifier to a list of local users; and rejecting said electronic message is if said originator identifier is not found in said list of local users.

22. A computer-readable medium having store therein one or more sequences of instructions for causing at least one processor to perform a method for creating an authenticated electronic userid, the method comprising:

receiving a request for said authenticated eletronic userid;

retrieving an originator key, said originator key corresponding to a local userid;

hashing said originator key, said local userid, and at least a portion of a remote userid to form a digital signature;

converting said digital signature from a first digital format into a second digital format, said digital signature in said second digital format being an adapted digital signature;

concatenating said adapted digital signature with at least an originator identifier; and returning a result of said act of concatenating as said authenticated electronic userid.

23. A computer-readable medium having stored therein one or more sequences of instructions for causing an authenticated message server to create and verify an authenticated electronic userid, wherein creating said authenticated electronic userid comprises computer-implemented instructions for:

receiving a request for said authenticated electronic userid;

retrieving an originator key, said originator key corresponding to a local userid;

generating a first adapted digital signature, said first adapted digital signature based on said originator key and at least a portion of a remote userid;

concatenating said first adapted digital singature with at least an originator identifier; and returning a result of said step of concatenating as said authenticated electronic userid; and wherein verifying said authenticated electronic userid comprises computer-implemented instructions for:

receiving an eletronic message from a remote user, said eletronic message comprising said authenticated eletronic userid;

extracting said originator identifier, said first adapted digital signature, and least said portion of said remote userid from said authenticated eletronic userid;

retrieving said originator key based on said originator identifier;

generating a second adapted digital signature, said second adapted digital signature based on at least originator key and at least said portion of said remote userid;

comparing said first adapted digital signature to said second adapted digital signature;

accepting said electronic message from said remote user if said first adapted digital signature match; and rejecting said eletronic message from said remote user if said first adapted digital signature and said second adapted digital signature do not match.

24. The computer-readable medium of claim 23, wherein said acts of generating said first adapted digital signature and said second adapted digital signature comprise:

hashing said originator key, said portion of said remote userid, and one or more other identifiers to form a digital signature; and converting said digital signature from a first digital format into a second digital format, said digital signature in said second digital format being said adapted digital signature.

25. The computer-readable medium of claim 23, wherein said acts of generating said first adapted digital signature and said second adapted digital signature comprise:

performing an encryption function using said originator key, said portion of said remote userid, and one or more other identifiers to form a digital signature; and converting said digital signature from a first digital format into a second digital format, said digital signature in said second digital format being said adapted digital signature.

26. The computer-readable medium of claim 24, wherein said one or more other identifiers include local user information.

27. The computer-readable medium of claim 25, wherein said one or more other identifiers include local user information.

28. The computer-readable medium of claim 23, wherein said act of verifying said authenticated eletronic userid further comprises:

extracting said originator identifier from said envelope information associated with said electronic message;

comparing said originator identifier to a list of local users; and rejecting said electronic message if said originator identifier does not match a particular local userid in said list of local users.

29. A computer-readable medium having store therein one or more sequences of instructions for causing at least one processor to perform a method for filtering junk eletronic mail, the method comprising:

receiving an eletronic message from a remote user;

generating an adapted digital signature based on an originator identifier and remote suer information from said eletronic message and an originator key, said act of generating comprising:

hashing a local userid associated with said originator identifier, said remote user information, and said originator key to form a digital signature;

transforming said digital signature from a first digital format to a second digital format; and returning said digital signature in said second digital format as said adapted digital signature;

comparing said adapted digital signature to a portion of said eletronic message;

accepting said eletronic message if said adapted digital signature and said portion of said electronic message match; and rejecting said eletronic message if said adapated digital signature and said portion of said electronic message do not match.

30. The computer-readable medium of claim 29, wherein said electronic message is a reply to a first electronic message sent from a local userid, said first electronic message comprising said originator identifier, and wherein said portion of said electronic message compared to said adapted digital signature being generated by acts associated with said local userid.

31. The computer-readable medium of claim 30, wherein said acts associated with said local userid comprise:

hashing said local userid, said remote user information, and said originator key to form a first digital signature;

transforming said first digital signature from said first digital format to said second digital format; and returning said first digital signature in said second digital format as said portion of said electronic message.

* * * * *